G. A. WIECHERT.
TOOTH PROTECTOR FOR DENTAL CLASPS.
APPLICATION FILED JAN. 18, 1922.
1,426,935.
Patented Aug. 22, 1922.
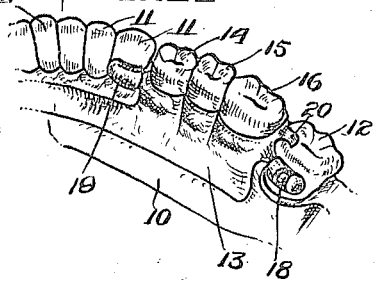
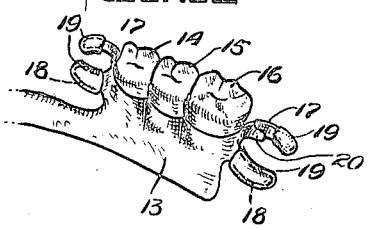
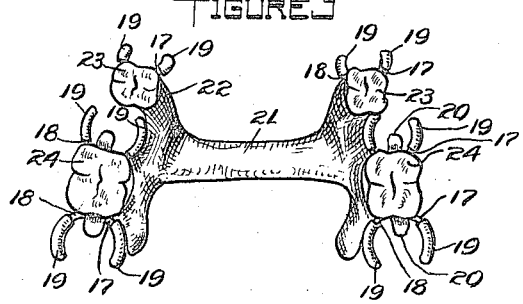
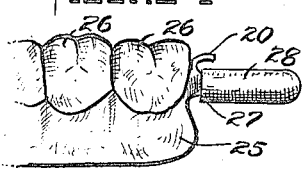
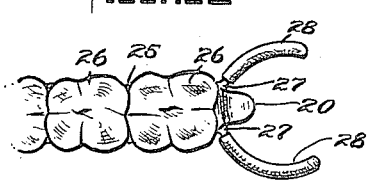
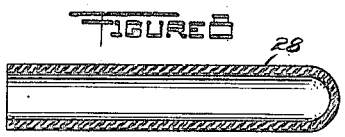
INVENTOR
George A. Wiechert
BY
Walton Harrison
ATTORNEY
WITNESS
M. E. Lessin

UNITED STATES PATENT OFFICE.

GEORGE A. WIECHERT, OF NEW YORK, N. Y.

TOOTH PROTECTOR FOR DENTAL CLASPS.

1,426,935.  Specification of Letters Patent.  Patented Aug. 22, 1922.

Application filed January 18, 1922. Serial No. 530,204.

*To all whom it may concern:*

Be it known that I, GEORGE A. WIECHERT, a citizen of the United States, residing in the city of New York, borough of Queens, county of Queens, and State of New York, have invented certain new and useful Improvements in Tooth Protectors for Dental Clasps, of which the following is a full, clear, and concise description.

My invention relates to tooth protectors used in connection with clasps; that is, to devices for protecting persons using dentures of various kinds, and including orthodontial appliances, from the undesirable effects generally experienced when their teeth are engaged directly by metallic clasps of the type used upon the dentures.

More particularly stated, I seek to provide each of the metallic fingers of the dental clasp with a protecting member made of soft rubber or some equivalent material, so as to envelop the fingers of the clasp where they grasp the tooth.

The human teeth, even in the best of health, are always very sensitive to metallic bodies secured to them, and especially where the metallic bodies engage them directly and are subjected to extremes of heat and cold, or when the metallic bodies have slight movements, accidental or otherwise relatively to the teeth.

My idea, therefore, is not to apply the metallic fingers of the clasp directly to the surface of the tooth to which the clasp is to be secured, but is to separately envelop the fingers of the clasp in coverings of soft rubber or the like, fitted upon them somewhat after the manner that the fingers of a glove are fitted upon the fingers of a person wearing the glove; and to bend the fingers of the clasp, thus enveloped, to cause them to grasp the tooth.

By this arrangement I interpose, between the tooth and the metallic portion of the clasp, a resilient material, both heat insulating and electrically insulating, and which presents to the tooth a so-called clinging surface peculiarily adapted for maintaining a firm grip upon the tooth, and yet allows an infinitesimal play as between the tooth and the fingers of the clasp. This play, like the heat insulation and the electrical insulation afforded by my device, is of very great importance as affecting the comfort of the wearer.

Reference is made to the accompanying drawing forming a part of this specification, and in which like reference numerals indicate like parts throughout the several figures.

Figure 1 is a fragmentary perspective of a human gum carrying a denture provided with my improved tooth protector.

Figure 2 is a fragmentary perspective of the said denture, and parts carried by it.

Figure 3 is a plan view of another denture, differing in form from the one shown in Figures 1 and 2 and provided with my improved tooth protectors.

Figure 4 is a fragmentary side elevation of a denture carrying one of my improved tooth protectors of a form differing slightly from those appearing in Figures 1 to 3 inclusive.

Figure 5 is a fragmentary plan of the denture and parts associated therewith, shown in Figure 4.

Figure 6 is a longitudinal section through the form of my tooth protector shown in Figures 1 to 3 inclusive.

Figure 7 is an end elevation of the tooth protector shown in Figure 6.

Figure 8 is a longitudinal section through the form of my tooth protector shown in Figures 4 and 5.

Figure 9 is an end elevation of the form of my tooth protector shown in Figure 8.

A human gum appears at 10 and carries a number of natural teeth 11, 12. Fitted upon the gum 10 is a denture 13 carrying a number of artificial teeth 14, 15 and 16. The denture is provided with a number of clasp fingers 17, 18, these clasp fingers being arranged in pairs, as may be readily understood from Figure 2, each pair practically constituting a clasp.

Detachably mounted upon the clasp fingers 17, 18, are my improved protectors 19, each having the form of a cylinder closed at one of its ends, as indicated in Figures 7 and 8.

The denture is provided with tongues 20, serving as braces, as is customary in this art.

In Figure 3 the denture appears at 21 and is provided with outwardly extending portions 22 carrying artificial teeth 23 and 24. In this instance the clasp fingers 17 and 18 carry the tooth protectors 19, as above described with reference to Figures 1 and 2.

In the form of my device appearing in Figures 4 and 5 the denture is shown at 25, and carries artificial teeth 26. The denture also carries a pair of clasp fingers 27, and fitted upon these clasp fingers are a pair of my tooth protectors 28. The clasp fingers 27 differ in form from those above described, in that they are flattened, and the tooth protectors 28 differ from the tooth protectors 19 above described, in that they are also somewhat flattened, as may be understood from Figures 8 and 9. My purpose in thus flattening the clasp fingers 27 and in giving the finger protectors proper form to fit them, as indicated in Figures 8 and 9, is to render the clasp fingers each comparatively easy to bend in one direction, in order to facilitate its application to a tooth. The tooth protector fits waterproof upon the clasp finger.

The tooth protector may be held upon the clasp finger in either of two ways; that is, by its own adhesion due to a tight fit, or by aid of an adhesive, such as a suitable cement. If a cement be used, the clasp finger is dipped into it and then the protector is slipped over the clasp finger.

While the material of the tooth protector may have any color desired, I prefer to give it the same color as that of the natural teeth. In this manner the presence of the clasp is rendered less noticeable to the casual observer.

An advantage of my tooth protector is that it can slide up or down relatively to the tooth without scraping the latter.

Another advantage is that it may be easily removed and replaced; also that it may be passed over irregularities upon the tooth, and that it is self-adjustant to a great extent, independently of the precise form of the particular tooth with which it is associated.

The operation of my device may be readily understood from the foregoing description. When my improved tooth protector in either of its forms is to be applied to a metallic clasp for a tooth, the protector is simply slipped over one of the clasp fingers, and thus fitted tightly thereupon, as illustrated in the drawing. This done the operator bends the clasp fingers toward each other so as to grip the tooth. For this purpose, a pair of forceps suitable for the purpose are preferably employed.

With a pair of my improved tooth protectors mounted upon a clasp and carried by a denture properly fitted, the denture may be worn without appreciable discomfort. The clasp thus prepared and equipped cannot cause the disagreeable sensation so commonly known, and due to the contact of the natural tooth with a metallic object fitted upon it more or less imperfectly, and unavoidably having a little play relatively to it. My device is well adapted for use upon the clasps used in orthodontial appliances— that is, appliances used for correcting the spacing and positioning of the natural teeth, and in which the mechanical strain upon the clasp is considerable.

The disagreeable sensation above mentioned, and which by my invention I seek to obviate entirely or to alleviate as much as possible, may be readily experienced by any one at any time. In order to experience it, all a person need do is to bite gently upon a metallic body such as a nail or a key, meanwhile slightly turning the object or shifting its position a trifle relatively to the teeth in contact with it. The sensation experienced by following this course is vastly different from that experienced by biting gently upon a piece of soft rubber, such as the eraser carried upon a pencil, and meanwhile slightly turning the piece of soft rubber or otherwise shifting its position relatively to the teeth in engagement with it.

While my invention is intended primarily to protect the teeth of the patient against the disagreeable sensation above described, it performs other important functions. It acts to some extent as a shock absorber, for cushioning slight movements between the denture and the tooth to which the denture is connected by means of the clasp. It also protects the metallic clasp fingers from galvanic action, and insulates the tooth from the clasp fingers, as regards extremes of heat and cold as well as electric currents. In this connection it may be pointed out that, owing to the extremely sensitive nature of the teeth, and particularly such teeth as are not in all respect normal and healthy said extremes of hot and cold and also galvanic action, though infinitesimal in degree, may cause discomfort and annoyance to the patient.

I do not limit myself to the precise construction here particularly described and illustrated, as variations may be made therein without departing from my invention, the scope of which is commensurate with my claims.

Having thus described my invention, what I claim as new and desire to secure by Letters Patent is as follows:

1. In a tooth protector for dental clasps the combination of a denture provided with a clasp finger, and a covering carried by said clasp finger for engaging a natural tooth, in order to enable said clasp finger to exert pressure upon said tooth without directly engaging the same.

2. In a device of the character described the combination of a denture and a clasp carried by said denture and provided with a clasp finger adapted to be bent in order to exert pressure upon a natural tooth, and a tooth protector carried by said clasp finger and engaging said tooth, said tooth protector being made of resilient material and so fitted upon the clasp finger as to practically envelop the same.

3. In a device of the character described the combination of a tooth clasp provided with a pair of oppositely disposed clasp fingers adapted to be bent toward each other in order to exert pressure upon a tooth, and a pair of tooth protectors each mounted upon one of said clasp fingers and so positioned as to engage oppositely disposed portions of the tooth, each of said tooth protectors being made of waterproof material and having such form as to envelop the clasp finger whereby it is carried.

4. In a dental clasp the combination of a clasp member for exerting pressure upon a tooth and a cushioning member carried by said clasp member and provided with a clinging surface for engaging the tooth, said cushioning member having approximately the same color as a natural tooth.

GEORGE A. WIECHERT.